United States Patent

Colling et al.

[11] 3,982,509
[45] Sept. 28, 1976

[54] ENGINE THROTTLE POSITIONING APPARATUS

[75] Inventors: Ronald L. Colling, Millington; Myron U. Trenne, Utica, both of Mich.

[73] Assignee: General Motors Corporation, Detroit, Mich.

[22] Filed: July 14, 1975

[21] Appl. No.: 595,519

[52] U.S. Cl. .................. 123/97 R; 123/103 R; 180/109; 180/108; 180/105 E
[51] Int. Cl.² .......................................... F02D 11/08
[58] Field of Search .............. 180/105, 105 E, 108, 180/109; 123/98, 97 R, 103 R

[56] References Cited
UNITED STATES PATENTS

| | | | |
|---|---|---|---|
| 2,157,652 | 5/1939 | Merriman | 123/103 E |
| 3,189,120 | 6/1965 | Bohl | 180/108 |
| 3,198,280 | 8/1965 | Van Ostrom | 180/108 |
| 3,392,799 | 7/1968 | Ishikawa | 180/109 X |
| 3,485,316 | 12/1969 | Slavin et al. | 180/105 R |
| 3,727,714 | 4/1973 | Ishikawa | 180/110 X |

Primary Examiner—Charles J. Myhre
Assistant Examiner—William C. Anderson
Attorney, Agent, or Firm—Robert M. Sigler

[57] ABSTRACT

The throttle of a vehicle mounted engine is biased toward its closed position by a return spring, is linked to manual throttle positioning means through a lost motion spring having a greater spring constant than that of the return spring and is provided with a rigid link having a pair of spaced apart stops. The driven member of a clutch extends between the two stops to engage one or the other and override the manual throttle positioning means to position the throttle. Means are provided for generating a signal indicative of clutch driven member position; and an actuator is engaged with the clutch driving member to drive the driven member, when the driving and driven members are engaged, in response to the driven member position signal and an override signal. The vehicle has a brake system, means to generate a signal indicative of brake actuation and means to disengage the clutch driven and driving members upon receipt of the brake actuation signal.

1 Claim, 2 Drawing Figures 3,982,509

ENGINE THROTTLE POSITIONING APPARATUS

SUMMARY OF THE INVENTION

This invention relates to vehicle engine controls and especially those allowing alternate control between normal manual throttle levers or pedals and automatic throttle controls.

Almost all engine driven vehicles include a throttle for varying the power delivered by the engine and manual means for the vehicle operator to control the position of such throttles. In addition, some vehicles have been provided with automatic vehicle speed control systems using a vehicle speed feedback signal to control the engine throttle position. Such vehicles have required special throttle control mechanisms to provide for selective manual or automatic control and to automatically allow one to override the other in certain conditions.

In addition, systems have been developed to improve vehicle wheel traction upon acceleration by detecting relative rotation between driven and undriven wheels and cycling engine power on and off rapidly to reduce such slippage. The vehicle engine throttle provides a natural means for cycling such power on and off.

This invention provides apparatus for controlling an engine throttle by manual means or in response to either a vehicle speed monitoring system or a vehicle traction improving system, all on the same vehicle. To the normal throttle return spring and link from the throttle to the manual throttle positioning means, this invention adds an override spring in the aforesaid link, which override spring has a spring constant significantly greater than that of the return spring so that throttle position normally follows the manual throttle positioning means but can also be moved independently thereof. This invention further provides, attached to the throttle, a rigid link having a pair of spaced apart stops and a clutch with a driven member extending between the spaced apart stops and engageable with either to position the throttle independently of the manual throttle positioning means. The clutch is further provided with means to generate a driven member position signal and a driving member engaged by an actuator which is controlled by a control circuit receiving a position feedback signal from the driven member generating means and additional input signals from the speed or traction monitoring means. In addition, means are provided for generating a signal upon actuation of the vehicle brake system to disengage the driving and driven members of the clutch to return control of the throttle position to the manual throttle positioning means. Further details and advantages of this invention will be apparent from the accompanying drawings and following description of the preferred embodiment.

DESCRIPTION OF THE PREFERRED EMBODIMENT

Figure 1:
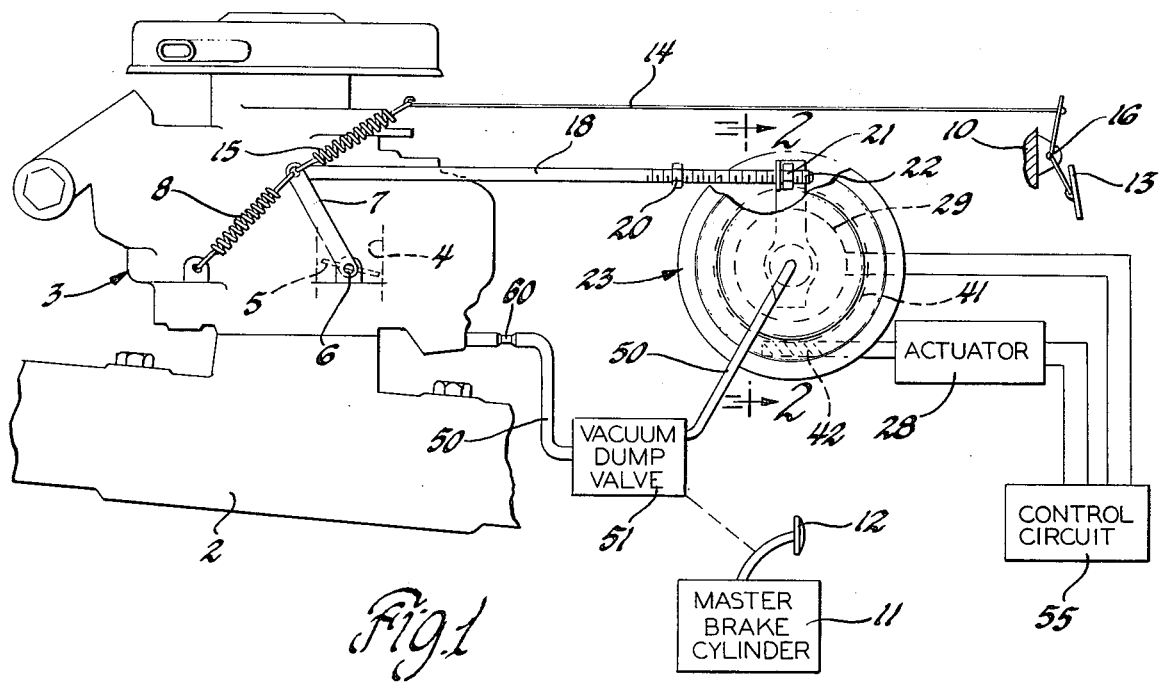
FIG. 1 shows an embodiment of this invention in its environment.

Referring to FIG. 1, an engine 2 has a carburetor 3 with an air induction passage 4, the flow through which is controlled by a throttle 5 rotatable on a shaft 6. Carburetor 3 could be replaced by a fuel injection mechanism with injector rack control; however, regardless of what type of air and fuel induction means is used with engine 2, throttle 5 controls the amount of power produced in engine 2.

An arm 7 attached to shaft 6 is effective to rotate throttle 5 from its closed or minimum power position shown in FIG. 1 clockwise to its full open position. A return spring 8 is attached in tension between arm 7 and carburetor 3 to bias throttle 5 toward its closed position.

Engine 2 is mounted on a vehicle 10 with a brake system represented by master brake cylinder 11 and pedal 12 and manual throttle positioning means represented by a throttle pedal 13. Throttle pedal 13 is attached through a link 14 and an override spring 15 to arm 7 so that springs 8 and 15 extend in opposite directions from arm 7. Throttle pedal 13 is pivoted at 16 so that depression of throttle pedal 13 applies tension to link 14 and override spring 15 to bias throttle 5 in a direction to open it. Override spring 15 is provided with a spring constant significantly greater than that of return spring 8 so that when the depression of throttle pedal 13 produces opposing tensions on arm 7 from return spring 8 and override spring 15, most of the expansion will take place in return spring 8 and arm 7 will generally follow the position of throttle pedal 13.

Also attached to arm 7 and extending from arm 7 in the same general direction as override spring 15 is a rigid link 18 having spaced apart stops 20 and 21 adjacent its free end 22. Throttle override apparatus 23, normally attached to carburetor 3 but shown separately and enlarged in FIG. 1, acts through rigid link 18 to vary the position of throttle 5 independently of the position of throttle pedal 13.

Figure 2:
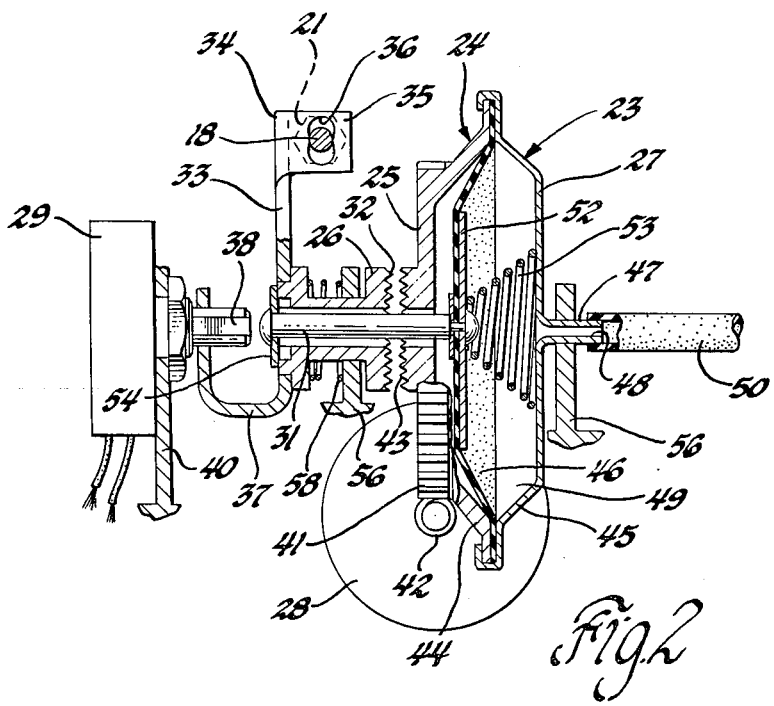
FIG. 2 is a view along line 2—2 in FIG. 1.

Throttle override apparatus 23 is shown in cutaway side view in FIG. 2. It comprises a clutch 24 with a driving member 25, driven member 26, and clutch actuator 27, a throttle actuator 28 engaged with driving member 25 and a position feedback potentiometer 29 engaged with driven member 26.

Clutch driven member 26 rotates about a shaft 31 and includes a clutch surface 32 and a radially extending arm 33 having, near its outer end 34, a tab 35 with an opening 36. Rigid link 18 projects through opening 36, with stop 20 on one side of tab 35 and stop 21 on the other side of tab 35. A generally U-shaped arm 37, which may be an extension of arm 33 past the shaft 31, is also fixed to rotate with clutch driven member 26 about shaft 31. It is fixed to the movable member 38 of position feedback potentiometer 29. If, as in the preferred embodiment shown in FIGS. 1 and 2, potentiometer 29 is rigidly mounted on a mounting flange 40 of carburetor 3, the attachment between arm 37 and potentiometer shaft 38 allows axial slippage therebetween so that movable arm 37 can move axially along with driven member 26 while maintaining a constant rotational orientation between driven member 26 and potentiometer shaft 38.

Driving member 25 includes a peripheral driven gear 41 engaged by a worm gear 42 of throttle actuator 28. Clutch driving member 25 further includes a clutch surface 43 generally parallel to, and adapted for engagement with, clutch surface 32 of clutch driven member 26. An outwardly extending flange 44 of driving member 25 forms one side of the clutch actuator 27. An end cover 45 having a peripheral rim clamped around flange 44 and holding a flexible diaphragm 46 forms the other side of clutch actuator 27 and defines a vacuum chamber 49 between itself and diaphragm 46. End cover 45 is provided with an outwardly extending tube 47 which defines an opening 48 connected through a conduit 50 including an orifice 60 and a vacuum dump valve 51, as seen in FIG. 1, to a source of induction vacuum in carburetor 3. Vacuum dump valve 51 includes a conduit open therethrough to allow communication through conduit 50; however, it also includes a normally closed bleed conduit to atmosphere which is opened during actuation of master brake cylinder 11 to open conduit 50 to atmosphere. Shaft 31 is attached to flexible diaphragm 46 with a stiffening plate 52 and is biased to the left in FIG. 2 by a spring 53 compressed between plate 52 and end cover 45.

Clutch driven member 26 is constrained by a washer 54 and spring 58 to move axially with shaft 31 while being free to rotate with respect thereto. Throttle override apparatus 23 is shown in FIG. 2 with clutch driving member 25 and driven member 26 disengaged, as they would be with engine 2 turned off or master brake cylinder brake 11 actuated and vacuum dump valve 51 thus open to atmosphere, with atmospheric pressure thus supplied to chamber 49. With engine 2 operating and vacuum dump valve 51 closed from atmosphere, manifold vacuum is communicated to chamber 49 and diaphragm 46 moves to the right, thus acting through shaft 31 to pull driven member 26 into engagement with driving member 25. Rigid link 18 is connected loosely enough to arm 7 to allow a small sideways rotation along with tab 35 on arm 33. With clutch driving member 25 and driven member 26 engaged, throttle actuator 28 positions clutch driven member 26 and, if such positioning brings tab 35 into contact with stop 20 or 21, moves rigid link 18 to position throttle 5 independently of the position of throttle pedal 13. Potentiometer 29 is also positioned with clutch driven member 26 to provide an appropriate feedback signal to a control circuit 55, which also receives command signals from the vehicle speed or traction maintenance systems. The throttle override apparatus 23 is rotatably supported on a pair of mounting flanges 56 on carburetor 3.

In operation, the vehicle operator may manually open throttle 5 to the desired position by depressing throttle pedal 13 or allow throttle 5 to be closed by return spring 8 by releasing throttle pedal 13. If the operator decides to use the automatic speed maintenance system, he activates the system by means not shown and appropriate signals are supplied to control circuit 55 to control actuator 28. With clutch 24 engaged, actuator 28 causes arm 33 to engage stop 21 on rigid link 18 and open throttle 5 to the called for position, the position of throttle 5 being determined by the output signal from feedback potentiometer 29. With the automatic speed maintenance system operating, the operator may manually open throttle 5 to a greater degree by depressing throttle pedal 13. Arm 33 will not change position but link 18 will move to the right. Upon release of throttle pedal 13, link 18 moves to the left until stop 21 once again engages tab 35; and automatic positioning of throttle 5 resumes. Actuation of master brake cylinder 11 at any time causes clutch 24 to become disengaged; whereupon, throttle pedal 13 is not being depressed, return spring 8 rotates throttle 5 to its closed position and, through link 18 and arm 33, clutch driven member 26 and potentiometer 29 to the positions shown in FIGS. 1 and 2. It should be noted that, with the position of potentiometer 29 corresponding to that of the driven member 26, resumption of automatic control with the release of master brake cylinder 11 will cause throttle 5 to once again move to the position demanded by control circuit 55 at that time.

During acceleration with wheel slippage, the throttle pedal 13 will usually be depressed with throttle 5 nearer to its full open position than its closed position. Thus rigid link 18 with stop 20 will be positioned considerably to the right of the position shown in FIG. 1. A throttle closure signal from control circuit 55 in response to a wheeel slippage sensor will cause arm 33 to rotate counterclockwise in FIG. 1 against stop 20 to move link 18 and thus throttle 5 to its closed position. Override spring 15 allows this to occur even if throttle pedal 13 is completely depressed. Upon a throttle opening signal, override spring 15 helps open throttle 5 once again. Naturally, actuation of master brake cylinder 11 during this mode of vehicle operation will once again cause disengagement of clutch 24 with consequent return of manual control by throttle pedal 13. However, this will probably happen very seldom, since it is unlikely that the vehicle operator will attempt to attain maximum acceleration at the same time he is applying his vehicle brakes.

This invention is thus seen to be a convenient apparatus for coordinating manual and automatic throttle control for a vehicle engine. Of course, the embodiment shown is purely for purposes of description and illustration. Equivalent embodiments will occur to those skilled in the art, and this invention should therefore be limited only by the claims which follow.

We claim:

1. Apparatus for positioning a throttle on a vehicle mounted engine, manually or in response to an override signal, in or between a closed position for minimum engine power and a full open position for maximum engine power, the vehicle including brake means, the throttle positioning apparatus comprising:

return spring means attached to the throttle and effective to bias the throttle toward its closed position;

manual throttle positioning means attached to the throttle through a lost-motion spring having a greater spring constant than the return spring and effective to move the throttle against the return spring bias to an open position, whereby the throttle can be manually set;

a rigid link attached to the throttle to position the throttle independently of the manual throttle positioning means, the rigid link including first and second spaced stops;

clutch means including driving means and driven means, the driven means extending between the rigid link stops and movable, when engaged by the driving means, in one direction to engage the first stop and thereby move the throttle toward its closed position and in the other direction to engage the second stop and thereby move the throttle toward its full open position, the clutch means further including means responsive to the position of the driven member to generate a signal indicative of the position thereof;

actuator means engaged with the clutch driving member and responsive to the clutch driven member position signal and the override signal, when the clutch driving and driven members are engaged, to position the clutch driven member, whereby the actuator means is capable of positioning the throttle through the clutch means and rigid link independently of the manual throttle positioning means;

means responsive to the vehicle brake means to generate a signal indicative of the actuation thereof; and means responsive to the brake actuation signal to disengage the clutch means driving and driven members and thereby prevent throttle control by the override signal during vehicle braking.

* * * * *